May 10, 1938.  G. R. ERICSON ET AL  2,116,512
TIRE RETREADING MACHINE
Original Filed July 11, 1932   6 Sheets-Sheet 3

JOHN H. KLASEY
GEORGE R. ERICSON
INVENTORS

BY George R. Ericson
ATTORNEY

Patented May 10, 1938

2,116,512

UNITED STATES PATENT OFFICE 2,116,512

TIRE RETREADING MACHINE

George R. Ericson, Kirkwood, and John H. Klasey, St. Louis, Mo., assignors, by mesne assignments to Bendix Products Corporation, South Bend, Ind., a corporation of Indiana Application July 11, 1932, Serial No. 621,858
Renewed December 14, 1936

30 Claims. (Cl. 90—24)

This invention relates to tire re-treading machines, and more particularly to machinery for re-grooving the treads of pneumatic tires which have worn slick.

It is an object of this invention to provide a generally new and improved machine and method for the above described purpose.

The reference numeral 1 indicates the base of the machine having an upward extension 2 in which a transverse shaft 3 is carried. This shaft may be driven by any suitable means at any suitable speed, usually from two to four revolutions per minute by any suitable mechanism such as the worm 4 and gear 5.

The gear 5 is rotatably mounted on a shaft which may be connected to the shaft for driving purposes by means of the collar 6, which is slidably mounted on the shaft 3, but prevented from rotation with respect thereto by the key 7.

Figure 1:
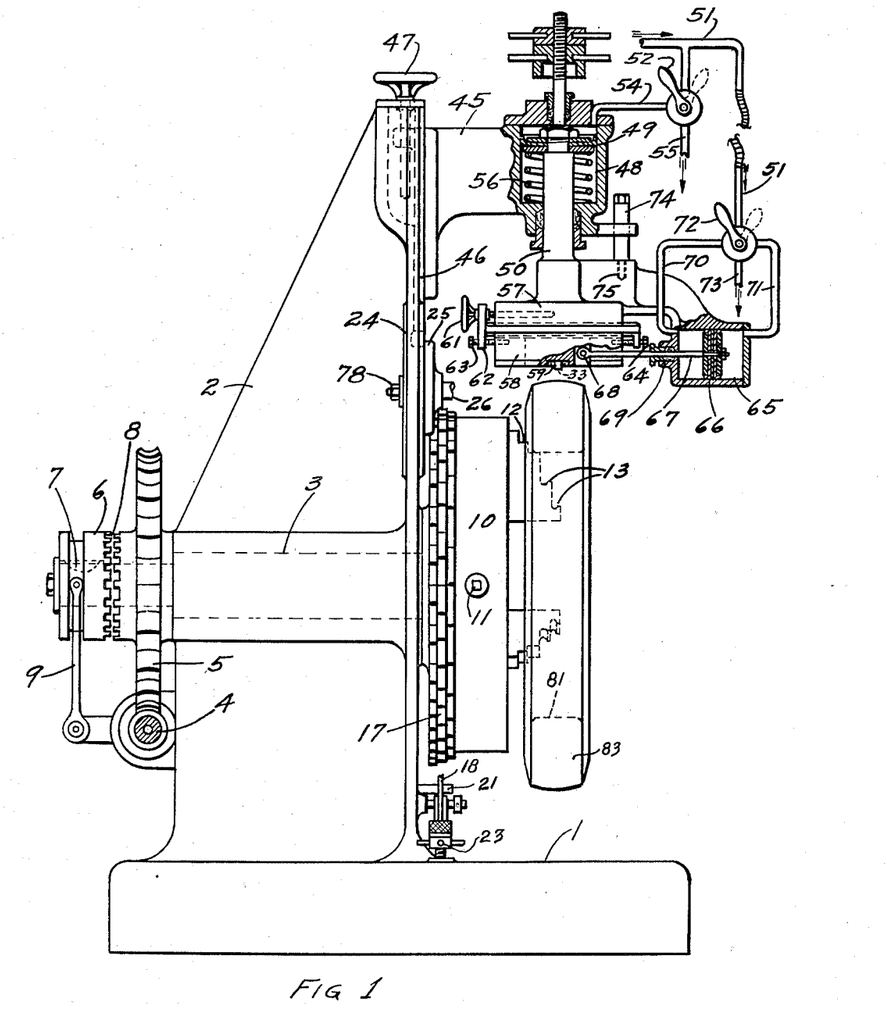
Figure 1 of the drawings shows the side elevation of a tire re-treading machine constructed according to our invention.
Figure 2:
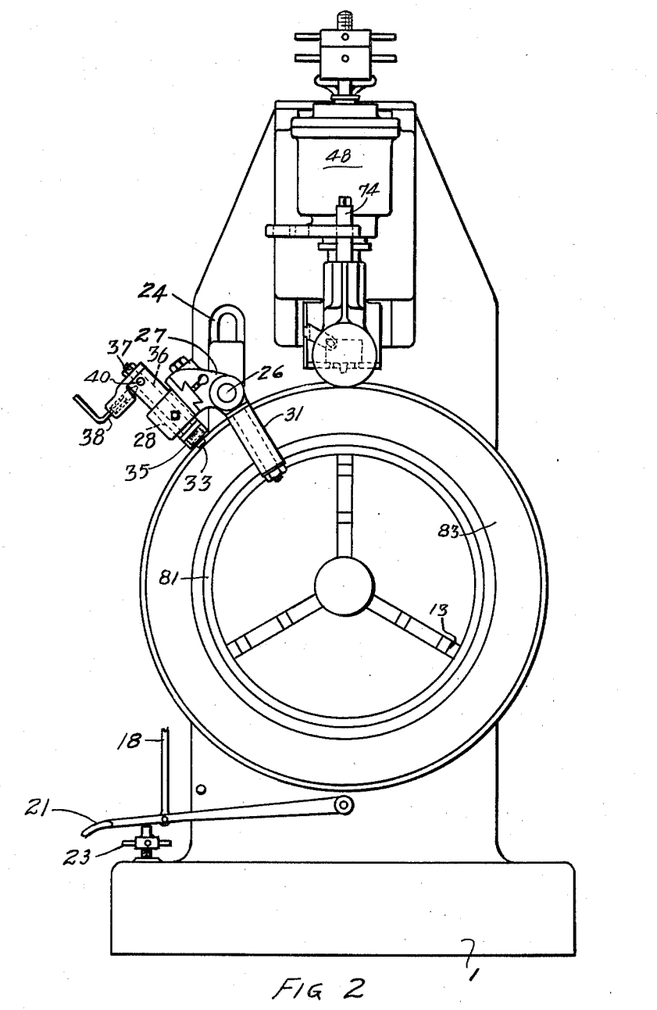
Figure 2 shows a front elevation of the same machine.
Figure 14:
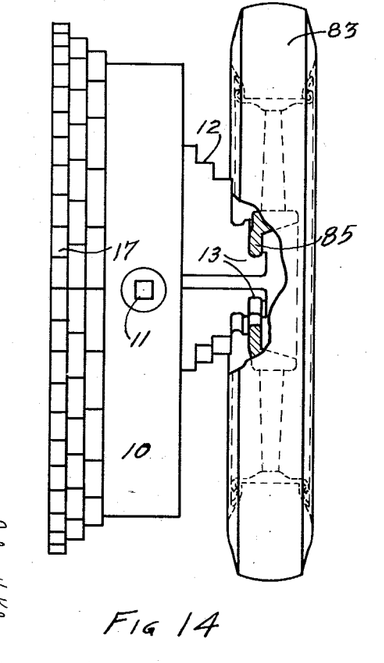
Figure 14 is a side elevation of the tire holding chuck showing a tire and wheel in position and a portion of the ratchet mechanism.
Figure 15:
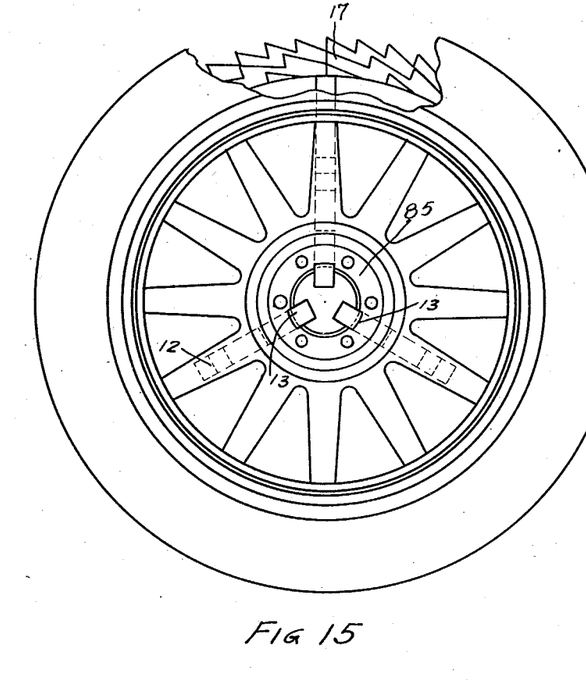
Figure 15 is a side elevation of the device shown in Figure 14, a portion of the tire being broken away for better illustration of its parts.

Clutch teeth 8 are provided in the gear and collar as the position of the collar is controlled by a manually operable lever 9. A 3-jawed holder or chuck 10 is carried by the shaft 3 and is provided with a jaw operating mechanism such as the screw 11. The chuck is preferably of the universal type so that the jaws are substantially self-centering. The jaws are provided with two steps or sets of steps as indicated at 12 and 13. The outer steps 12 are adapted for engagement with the rim of an automobile tire 83 as indicated in Figure 1, and the inner steps are adapted for engagement with the hub of a wheel as indicated in Figures 14 and 15. By this means the tire may be conveniently held in position on the chuck regardless of whether it is mounted on a rim or a wheel. It will be understood that the shaft 3 and the chuck may be driven by any suitable device, as, for instance, the motor 14.

Figures 3, 11:
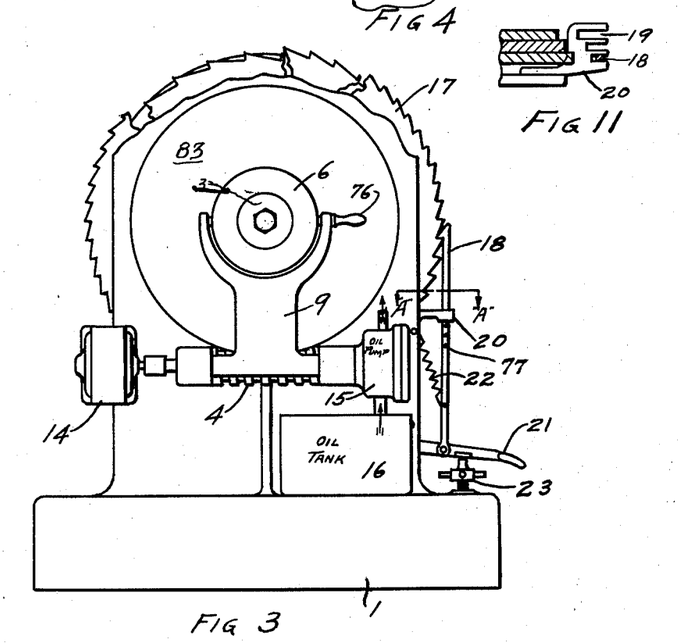
Figure 3 shows a rear elevation of the same machine.
Figure 11 is a fragmentary sectional plan view taken along the line A—A of Figure 3 showing a portion of the indexing device.
Figures 4, 5:
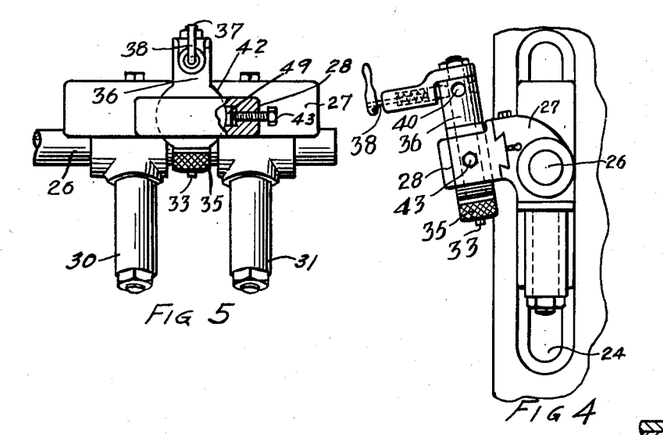
Figure 4 is a detail view showing tool holding device.
Figure 5 is a detail view of the tool holding device taken from another angle.

An oil pump or air pump 15 is driven by the same motor 14 as indicated, or by any other suitable means, and may receive oil from the tank 16 as indicated in Figure 3. This pump may deliver oil to the bearings of the machine and also furnish oil under pressure for a purpose hereinafter to be described. A number of disks provided with ratchet teeth 17 may be mounted upon the shaft 3 in any suitable manner for the purpose of indexing the chuck manually when the cross grooves are to be cut. A ratchet engaging device 18 is provided, which is adapted to be reciprocated in any one of the guiding slots 19 formed in the bracket 20. The movement of the pawl 18 is controlled by a foot lever 21 and spring 22. An adjusting device 23 is also provided if desired.

Inasmuch as the tire may not be exactly round, the circumferential grooves cannot conveniently be cut with the use of a stationary tool, and we have accordingly provided a tool holding device which can follow the eccentric surface of the tire and cut a properly spaced groove thereon. This device comprises a slot 24 in the frame of the machine and a manually adjustable block which may be adjusted in the slot manually and held in adjusted position by the nut 78. This adjustment is for the purpose of initially setting the tool holder for substantially different sizes of tires.

The block 25 carries a shaft 26 upon which the member 27 is rotatably and slidably mounted. The member 27 carries a cross-slide 28 which may be manually adjusted and held in adjusted position by the screw 29. A pair of rolls 30 and 31 are adjustably fixed to the shaft 26 and held in position by any suitable means such as the nut 32. These rolls are adjusted to the width of the tire so that the member 27 which constitutes the frame of the tire holder may slide endwise on the shaft to follow any sidewise eccentricity of the tire.

Figures 6, 7, 8, 9, 10:
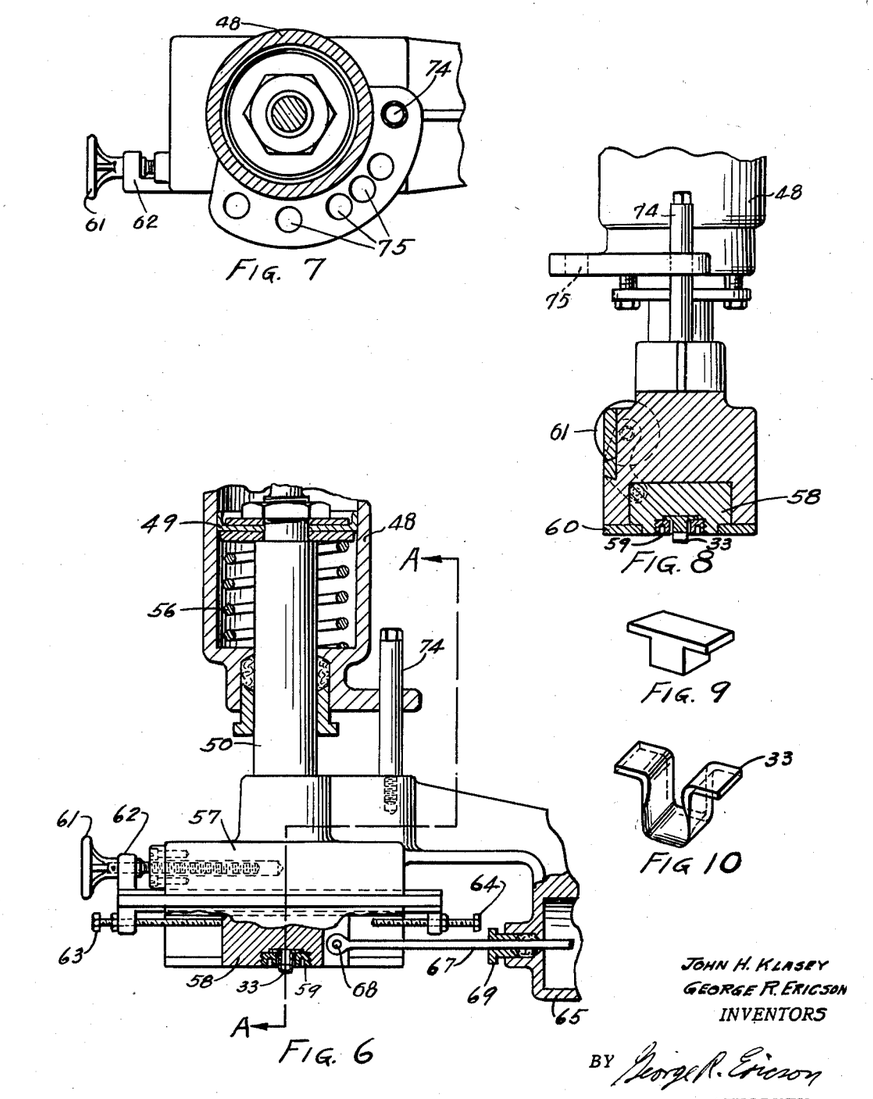
Figure 6 is a detail view of the cross groove cutting device, parts being taken away and others shown in section.
Figure 7 is a plan view of the device shown in Figure 6.
Figure 8 is a sectional view of the device shown in Figure 6, the section being taken along the line A—A of Figure 6.
Figure 9 is a detail showing the chip ejector.
Figure 10 is a perspective view of the cutting tool.
Figure 12:
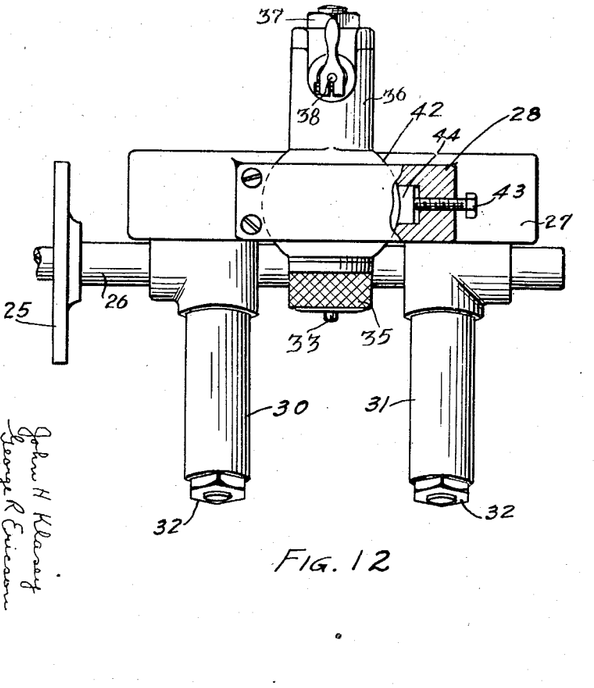
Figure 12 is a view of the tool holding device showing the same parts as shown in Figure 5, but on a larger scale.
Figure 13:
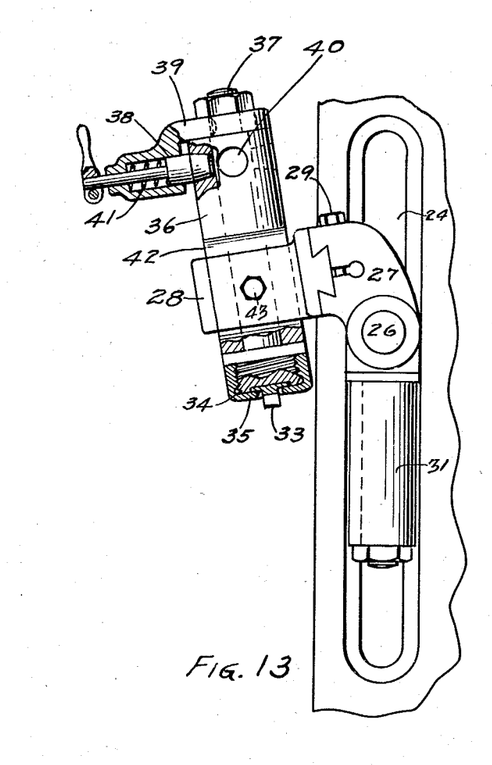
Figure 13 is a side view of the parts shown in Figure 12 with parts broken away and others shown in section.

The cutting tool 33 is formed in any desired manner to make incisions or grooves in the tire and as shown in Figure 10 is mounted in a holder 34 to which it is attached by any suitable means such as the threaded cap 35 which holds the tools snugly up against the block 34 as indicated in Figure 13. The block 34 is carried in a partially rotatable stock 36 by means of a bolt 37 which may be integral with the block 34 as indicated in Figure 13. The bolt 37 is rotatable in the stock 36 and its position with respect to the stock is controlled by a pin 38 which is slidably mounted in the bracket 39 and adapted to project into one or more holes 40 in the stock. The pin 38 can be retracted by compressing the spring 41 so as to rotate the tool whenever desired.

The stock 36 is provided with the partially circular portion 42 which is releasably held against rotation with respect to member 28 by means of screw 43 and lock 44. In operation the circumferential grooves are cut by placing the tire in the holder or chuck while inflated and without removing it from the wheel or rim. The rolls 30 and 31 are adjusted to the proper width for the tire, and the cutting tool 33 is set in the position shown in Figure 13.

Using the member 36 as a handle the operator forces the tool 33 into contact with the tire and as the tire is rotated the tool sinks into the rubber until the end of the member 35 contacts with the surface of the tire and thereby serves as a guide for the depth. The depth is maintained regardless of unevenness in the circularity of the tire by reason of the fact that the member 27 is free to rotate on the shaft 26 and the tire is held in position with respect to the sides of the tire by the rolls 30 and 31 which may cause the member 27 to slide on the shaft 26.

The mechanism for cutting transverse or diagonal grooves in the tire is as follows: A vertically adjustable head 45 is carried in suitable guides 46 on the upper part of the frame. This head may be vertically adjusted by the hand wheel 47. A cylinder 48 is formed in the head and a piston 49 provided with piston rod 50, is mounted in the cylinder. The line 51 from the oil pump is connected to the cylinder through a control valve 52. The branch 54 of the conduit leading from the control valve to the cylinder serves both as an inlet and an outlet passage way and a return line 55 leading back to the tank 16 is provided. By means of this arrangement the piston rod 50 may be moved down into the cylinder at will and when the oil pressure is released the spring 56 will return it to its upward position.

At the lower end of the piston rod 50 is a head 57 carrying a cross-slide 58 in which the cutting tool 33 is mounted by means of a screw 59. The cross-slide 58 is mounted slidably in the head and held in position by gibs 60 as more clearly illustrated in Figures 6 and 8. The stroke of the cross-slide is controlled by the hand wheel 61 carrying a slidable bracket 62 in which are fixed a pair of adjusting screws 63 and 64. The adjusting screws control the distance in their direction which the cross-slide may travel and the hand wheel 61 may be adjusted to simultaneously move the abutments 63 and 64 to follow sidewise irregularities in the tire without changing the length of the stroke.

The head 57 carries a cylinder 65 in which is double acting piston 66, a connecting rod 67 which is attached to the cross-slide as at 68. A suitable packing gland 69 may be provided. The oil is conveyed to the cylinder 65 by means of conduits 70 and 71 which are controlled by a valve 72. An outlet passage 73 leads back to the oil tank 16 and the valve 72 is so constructed that the oil pressure may be applied to either of the pipes 70 and 71 selectively and at the same time the other pipe will be connected with the outlet passage 73.

It will be noted that the head 57 is rotatable in a horizontal plane with respect to the machine and a locking pin 74 is provided for the purpose of holding the head in a selected angular position. This pin may be dropped into any one of the holes 75 for that purpose.

In operation, after the circumferential grooves have been cut, the transverse or diagonal grooves are cut as follows: With the tire in position on the holder or chuck as indicated in Figure 1, the hand wheel 61 and stop screws 63 and 64 are adjusted for the proper length and position of stroke, the pin 74 is placed in the proper one of the holes 75 to give the correct angularity for the cross grooves and the clutch 6 is disconnected by operating the handle 76 as illustrated in Figure 3. A ratchet wheel having the proper number of teeth 17 is provided and the pawl 18 is set in the proper one of the slots 19 to engage the ratchet wheel.

If desired, a stop pin or stop 77 is applied to the pawl to limit its upward movement. By this arrangement the tire may be rotated a predetermined distance each time the operator steps on the pedal 21. Having operated the pedal to find the location of the first groove, the operator opens the valve 52 to admit oil to the upper end of the cylinder 48, thereby forcing down the head 57 until it is stopped by the tire. The oil pressure is sufficient to properly flatten out the tread of the tire and cause the rubber to slightly bulge up into the cutting tool.

The valve 72 is then operated to apply oil pressure to the piston 66 and move the cutting tool through its stroke. After the stroke has been completed valve 52 is operated to cut off the pressure and release the oil from the cylinder 48, thereby permitting the upward movement of the head away from the tire. The tire is then indexed to the next groove, the valve 72 is operated to return the cutting tool to its original position, ready to begin a stroke and the operation is repeated until all of the cross grooves which are to be formed at that angle in the tire are cut. The angle may then be changed by removing the pin 74 and placing it is a different hole, if desired to cut grooves at another angle.

We claim:

1. In a tire re-grooving device, means to support a tire, a rubber cutting tool, guide means for said tool, means for pressing said guide means against the tread of a tire carried by the tire supporting means, and means for operating said tool in said guide means.

2. In a tire re-grooving device, means to support a tire, a rubber cutting tool, a rectilinear guide for said cutting tool, means for pressing said guide against said tire to flatten out the tread thereof and cause it to conform with said guide, and means for operating the cutting tool while the guide is pressed against said tire.

3. In a tire re-grooving device, a frame, a rotatable shaft carried by said frame, tire holding means carried by said shaft, means for driving the tire holding means at a continuous steady speed, means for disconnecting said driving means, means intermittently operable when said driving means is disconnected for operating said tire holding means through a predetermined angle of rotation, means adapted to form circumferential grooves in the tire during the continuous operation of the wire holding means, and means for forming grooves in the tread of said tire at an angle to said circumferential grooves when the continuous driving means is disconnected.

4. A tire re-grooving machine comprising a frame, tire supporting means rotatably carried by said frame, means for rotating the tire supporting means at a continuous steady speed, a head carried by said frame and slidable toward or away from the axis of the tire supporting means, a cutting tool, means for guiding said cutting tool in a direction to cut a groove at an angle to the tread of a tire carried by the tire supporting means, and means for reciprocating said cutting tool.

5. A tire re-grooving machine comprising a frame, tire supporting means rotatably carried by said frame, means for rotating the tire supporting means, a head carried by said frame and slidable toward or away from the axis of the tire supporting means, a cutting tool, means for guiding said cutting tool in a direction to cut a groove at an angle to the tread of a tire carried by the tire supporting means, means for reciprocating said cutting tool, a second tool holding device carried by said frame and a tool carried by said second tool holding device for cutting circumferential grooves in a tire carried by the tire supporting means.

6. A tire re-grooving machine comprising a frame, tire supporting means rotatably carried by said frame, means for rotating the tire supporting means, a head carried by said frame and slidable toward or away from the axis of the tire supporting means, a cutting tool, means for guiding said cutting tool in a direction to cut a groove at an angle to the tread of a tire carried by the tire supporting means, means for reciprocating said cutting tool, a second tool holding device carried by said frame, a tool carried by said second tool holding device for cutting circumferential grooves in a tire carried by the tire supporting means, and means for guiding said second tool to cut a groove in parallelism with the side of said tire.

7. A tire re-grooving machine comprising a frame, means carried by said frame for holding and rotating a tire, a cross slide carried by said frame, a cutting tool mounted on said cross slide for cutting circumferential grooves in said tire during the rotation thereof, and tire operated means for moving the cutting tool laterally in accordance with lateral variations in the tire.

8. In a device of the class described, a frame, tire rotating means carried by said frame, means associated with said tire rotating means to cause either continuous or intermittent rotation of said tire, a cutting tool carried by said frame, means for adjusting said cutting tool to selected positions to cut a plurality of circumferential grooves in the tread of said tire during continuous rotation thereof, a generally transversely extending tool guiding device adjustably mounted on said frame, a second cutting tool mounted in said tool guiding device, and means for operating said second cutting tool to cut grooves in the tread of said tire at an angle to said circumferential grooves.

9. In a device of the class described, a frame, tire carrying and rotating means mounted on said frame, a tire on the carrying and rotating means, a guideway adjustably mounted on said frame, fluid pressure operated means to move the guideway into engagement with the tire, a cutting tool slidably carried in said guideway, said guideway being adjustable to different angles, and fluid pressure operated means to move the cutting tool in the guideway.

10. In a machine for grooving the tread surface of tires, a base, means on the base for supporting a tire, a cutter, a carriage for said cutter, horizontal guideways on which said carriage is movable, means for supporting said guideways on said base and providing for vertical adjustment of said guideways relative to the chuck and for angular adjustment of said guideways about a vertical axis, and means to provide for a vertical sliding movement of said cutter independently of the vertical adjustment to accommodate said cutter to inequalities in the tire.

11. In a tire cutting machine, means for holding and rotating a tire, a rubber cutting tool, guide means for said tool, and fluid pressure operated means for holding said tool against the tread of said tire during rotation of the tire.

12. In a tire re-grooving device, tire holding means, indexing means, a rubber cutting tool, guide means for said tool, and fluid pressure operated means for moving the tool in said guide means.

13. In a machine for grooving tires and the like, a laterally adjustable cutter to engage the periphery of a rotating tire, and means controlled by said tire to adjust said cutter at a proper distance from the side of said tire throughout the rotation thereof.

14. In a machine for grooving tires and the like, a cutter mounted for lateral movement with relation to a rotating tire and adapted to engage the periphery of said tire during the rotation thereof, and a device connected with said cutter and having parts to engage the respective sides of said tire to impart lateral movement to said cutter if said tire does not rotate in a true plane.

15. In a machine for grooving tires and the like, a supporting structure, a member mounted on said structure for lateral movement with relation thereto, a cutter carried by said member and adapted to engage the periphery of a rotating tire, and a device connected with said member and having a part to engage the side of said tire and impart lateral movement to said member and said cutter if said tire does not rotate in a true plane.

16. In a machine for grooving tires and the like, a supporting structure, a member mounted on said structure, means for moving said member transversely to said structure, a cutter supporting device mounted on said member for lateral reciprocatory movement with relation thereto, a cutter carried by said device and adapted to engage the periphery of a rotating tire, means carried by said tansversely movable member for actuating said cutter supporting device, a driving element mounted on said supporting structure, and means for establishing a driving connection between said driving element and said actuating means and for maintaining said connection in all positions of said transversely movable member.

17. A tire treating machine comprising means to support a tire, indexing means for the supporting means, means to cut incisions in the road engaging surface of the tire, a support for the cutting means, and fluid pressure operated means to move the cutting means in opposite directions with reference to the road engaging surface of the tire.

18. A tire treating machine comprising means to support a tire, indexing means for the supporting means, means to cut incisions in the road engaging surface of the tire, a support for the cutting means, means to move the cutting means into and out of engagement with the road engaging surface of the tire, yielding means urging the last named means toward one extreme position, and fluid pressure operated means to move said means toward another extreme position.

19. In a tire re-grooving machine, a frame, means carried by the frame for supporting a tire, a cutting tool positioned to engage the tire, a depth gauge associated with the tool to regulate the depth of the cut, means for moving the tool with reference to the frame and tire comprising hydraulic means to move the tool into engagement with the tire and yielding means to move the tool away from the tire.

20. In a tire re-grooving machine, a frame, means carried by the frame for supporting and rotating a tire, a cutting tool adapted to engage the road engaging surface of the tire, a depth gauge associated with the tool to control the depth of the cut, means for moving the tool with reference to the frame and tire comprising fluid pressure operated means to move the tool into engagement with the tire and yielding means to move the tool away from the tire, and manually operable means to displace the tool laterally with reference to the road engaging surface of the tire.

21. A tire re-grooving machine comprising a frame, means associated with the frame for supporting a tire, means to cut incisions in the road engaging surface of the tire, guide means for the tool, and fluid pressure operated means for pressing the guide means against the road engaging surface of the tire.

22. A tire re-grooving machine comprising a frame, means associated with the frame for supporting a tire, means to cut incisions in the road engaging surface of the tire, guide means for the tool, and fluid pressure operated means for moving the cutter means in the guide means.

23. In a tire cutting machine, a tire supporting element, a tool to cut the road engaging surface of the tire, means to support the tool in operative relation with the road engaging surface of the tire, a depth gauge associated with the tool to control the depth of the cut, guides associated with the tool to direct the tool across the road engaging surface of the tire, and fluid pressure operated means to move the tool in said guides.

24. In a tire cutting machine, a tire supporting element, a tool to cut the road engaging surface of the tire, means to support the tool in operative relation with the road engaging surface of the tire, a depth gauge associated with the tool to control the depth of the cut, guides associated with the tool to direct the tool across the road engaging surface of the tire, fluid pressure operated means to move the tool in the guides, and manually operable means to vary the angular relation of said guides with reference to the road engaging surface of the tire.

25. A tire treating machine comprising means to support a tire, a tool to cut the surface of the tire, means including guides to position the tool in cutting relation with the surface of the tire, fluid pressure operated means to move the tool to cut the surface of the tire, and manually operable means to control the fluid pressure operated means.

26. A tire treating machine comprising means to support a tire, a tool to cut the surface of the tire, means including guides to position the tool in cutting relation with the surface of the tire, fluid pressure operated means to move the tool to cut the surface of the tire, and manually operable means to vary the angular relation of the tool with reference to the surface of the tire.

27. A tire treating machine comprising means to support a tire, a tool to cut incisions in the road engaging surface of the tire, fluid pressure operated means to position the tool in cutting relation with the surface of the tire, fluid pressure operated means to move the tool to cut the surface of the tire, manually operable means to vary the angular relation of the tool with reference to the surface of the tire, and manually operable means to control the fluid pressure operated means.

28. A tire treating machine comprising means to support a tire, a tool to cut incisions in the road engaging surface of the tire, fluid pressure operated means to position the tool in cutting relation with the surface of the tire, fluid pressure operated means to move the tool to cut the surface of the tire, manually operable means to vary the angular relation of the tool with reference to the surface of the tire, manually operable means to control the fluid pressure operated means, and indexing means operable when the tool is not engaging the tire to move the surface of the tire with reference to the tool.

29. A tire cutting machine comprising means to support a tire, a cutting tool, a support including a depth gauge for the cutting tool, means to move the cutting tool transversely across the road engaging surface of the tire, indexing means to move the road engaging surface of the tire with reference to the cutting tool when the tool is not cutting the tire, and power means to move the tool across the road engaging surface of the tire.

30. A tire cutting machine comprising means to support the tire, a tool to cut the road engaging surface of the tire, means associated with the supporting means to hold the tool in operative relation with the road engaging surface of the tire, means to control the depth of the cut formed in the road engaging surface of the tire, manually operable means associated with the tool holding means and the tire supporting means to move the tool laterally with reference to the road engaging surface of the tire, means to rotate the tire against the tool to form grooves in the road engaging surface thereof, and means controlled by the tire to position the tool at a constant distance from the side of the tire throughout the rotation thereof.

GEORGE R. ERICSON.
JOHN H. KLASEY.

CERTIFICATE OF CORRECTION.

Patent No. 2,116,512.                                May 10, 1938.

GEORGE R. ERICSON, ET AL.

It is hereby certified that error appears in the printed specification of the above numbered patent requiring correction as follows: Page 2, first column, line 27, for the word "lock" read block; same page, second column, line 61, for "is" read in; page 3, first column, line 13, claim 3, for "wire" read tire; and that the said Letters Patent should be read with this correction therein that the same may conform to the record of the case in the Patent Office.

Signed and sealed this 25th day of July, A. D. 1939.

(Seal)
Henry Van Arsdale,
Acting Commissioner of Patents.